J. J. MAHONEY.
FRUIT PICKER.
APPLICATION FILED DEC. 7, 1914.
1,152,331. Patented Aug. 31, 1915.
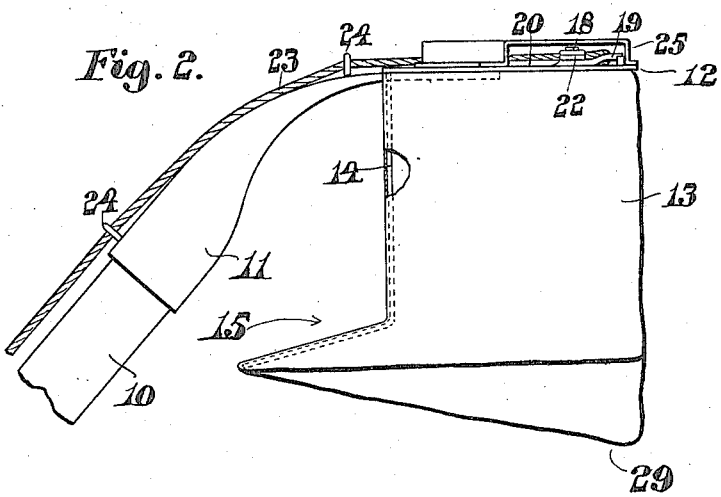
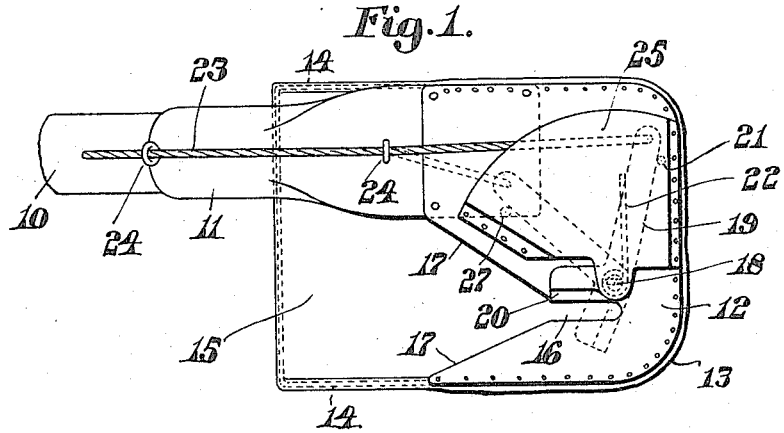
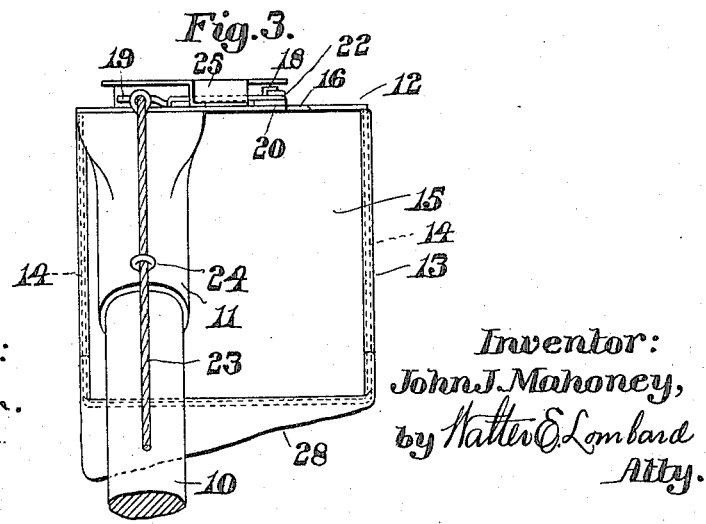
Witnesses:
Edward G. Allen.
Mary C. Smith.
Inventor:
John J. Mahoney,
by Walter E. Lombard
Atty.

UNITED STATES PATENT OFFICE.

JOHN J. MAHONEY, OF DORCHESTER, MASSACHUSETTS.

FRUIT-PICKER.

1,152,331.  Specification of Letters Patent.  Patented Aug. 31, 1915.

Application filed December 7, 1914. Serial No. 876,588.

*To all whom it may concern:*

Be it known that I, JOHN J. MAHONEY, a citizen of the United States of America, and a resident of Dorchester, in the county of Suffolk and State of Massachusetts, have invented certain new and useful Improvements in Fruit-Pickers, of which the following is a specification.

This invention relates to fruit pickers and particularly to that class of pickers in which the fruit is adapted to be gathered in a bag suspended from a pole.

The object of the present invention is to provide a picker which will be inexpensive to manufacture and effective in use.

The invention consists in suspending a bag from a notched plate secured to the end of a pole and providing said plate with a pivoted knife adapted to be moved over and to the rear of the notch, thereby severing the fruit stem therein.

The invention further consists in certain novel features of construction and arrangement of parts which will be fully understood by reference to the description of the drawings and to the claims hereinafter given.

Of the drawings: Figure 1 represents a plan of a fruit picker embodying the principles of the present invention. Fig. 2 represents a side elevation of the same, and Fig. 3 represents a front elevation of the same.

Similar characters designate like parts throughout the several figures of the drawings.

In the drawings, 10 is a pole to the end of which is secured the socket 11 of a flat plate 12. Three edges of the plate 12 are perforated and have secured thereto a bag 13 which is retained in shape at the front end by the bale 14 secured to and suspended from the plate 12 and forming a frame for the opening 15 in the bag 13. The plate 12 is provided with an elongated notch 16 therein, the edges of which are substantially parallel for a short distance and then flare toward the front and at one side of the pole 10 as clearly shown at 17 in Fig. 1. The plate 12 has pivoted thereto at 18 a bell crank lever 19, one arm of which is normally parallel with an edge of the notch 16 and is provided with a knife edge 20. The other arm of the lever 19 is normally held against a stop 21 by a spring 22 and has secured to its outer end the flexible pull member 23 extending through screw eyes 24 along the pole 10. One end of the spring 22 bears against the lever 19, while the other end is coiled about the pivot 18 and through an opening therethrough as shown in the drawings. The lever 19 is partially covered by the member 25. When the operator pulls upon the member 23 the longer arm of the lever 19 is moved into the position shown in dotted lines in Fig. 1 and against the stop 27. During this movement of the lever 19 about its pivot 18, the blade 20 will move across the notch 16 and to the rear thereof, severing the stem of the fruit and permitting it to drop into the bag 13. The bottom of the bag 13 is inclined downwardly toward the pole 10 as shown at 28 in Fig. 3 of the drawings, thereby causing any fruit dropped into the bag 13 to roll to the left and collect in the lower left hand corner 29 where it will not interfere with the further operation of the picker.

The bale 14 extends downwardly from the top plate 12 and then extends forwardly toward the support 10 as indicated in Fig. 2. One edge of the bottom of the bag 13 is secured to the forwardly extending portion of the bale, thus forming a yielding shelf below the opening 15 on which the fruit is adapted to fall when severed from its stem.

As the fruit collects in the corner 29, the weight thereof will tend to more perfectly balance the picker.

It is believed that the operation of the picker and its many advantages will be fully understood from the foregoing description.

Having thus described my invention, I claim:

1. A fruit picker consisting of a support; a top plate secured thereto near one edge and provided with a notch near its opposite edge opening toward said support; a bag suspended from three edges of said plate and having an inlet thereto beneath said notch, said bag having its bottom extending toward the support beyond the body portion of said bag whereby a shelf is formed to receive the fruit when severed from its stem.

2. A fruit picker consisting of a support; a top plate secured thereto near one edge and provided with a notch near its opposite edge opening toward said support; a bag suspended from three edges of said plate and having an inlet thereto beneath said notch, said bag having its bottom inclined downwardly toward the side in the rear of said notch.

3. A fruit picker consisting of a support; a top plate secured thereto near one edge and provided with a notch near its opposite edge opening toward said support; a bag suspended from three edges of said plate and having an inlet thereto beneath said notch, said bag having its bottom inclined downwardly toward the side in the rear of said notch and also inclined downwardly toward the side adjacent said support whereby the surface beneath the notch is kept free from fruit; and a manually operated knife pivoted to said plate and adapted to be moved over and to the rear of the notch in said plate.

Signed by me at 4 Post Office Sq., Boston, Mass., this 5th day of December, 1914.

JOHN J. MAHONEY.

Witnesses:
 EDWARD F. ALLEN,
 MARY C. SMITH.

Copies of this patent may be obtained for five cents each, by addressing the "Commissioner of Patents, Washington, D. C."